(12) United States Patent
Faruque et al.

(10) Patent No.: US 10,272,949 B2
(45) Date of Patent: Apr. 30, 2019

(54) SLIDING PROTECTIVE BATTERY SUPPORT TRAY

(71) Applicant: Ford Global Technologies, LLC, Dearborn, MI (US)

(72) Inventors: Mohammed Omar Faruque, Ann Arbor, MI (US); Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 210 days.

(21) Appl. No.: 15/286,189

(22) Filed: Oct. 5, 2016

(65) Prior Publication Data

US 2017/0029034 A1 Feb. 2, 2017

Related U.S. Application Data

(62) Division of application No. 14/813,339, filed on Jul. 30, 2015.

(51) Int. Cl.
| | | |
|---|---|---|
| *B62D 21/15* | (2006.01) | |
| *B60K 1/04* | (2006.01) | |
| *H01M 2/10* | (2006.01) | |
| *B60R 16/04* | (2006.01) | |

(52) U.S. Cl.
CPC .............. *B62D 21/157* (2013.01); *B60K 1/04* (2013.01); *H01M 2/1083* (2013.01); *B60K 2001/0438* (2013.01); *B60R 16/04* (2013.01); *B60Y 2306/01* (2013.01); *H01M 2220/20* (2013.01)

(58) Field of Classification Search
CPC .............. B60K 1/04; B60K 2001/0438; B60K 2001/0455; B60K 2001/0461; B60K 2001/0494; B60K 2028/006; H01M 2/1083; B60L 11/1877; B62D 21/152; B62D 21/157; B60R 16/04; F16B 31/021
See application file for complete search history.

(56) References Cited

U.S. PATENT DOCUMENTS

| | | | | |
|---|---|---|---|---|
| 5,474,408 | A | * 12/1995 | Dinitz | ................... F16B 31/021 256/13.1 |
| 5,555,950 | A | * 9/1996 | Harada | ..................... B60K 1/04 180/232 |
| 6,056,471 | A | * 5/2000 | Dinitz | ..................... E01F 9/681 403/2 |
| 6,158,538 | A | * 12/2000 | Botzelmann | ............. B60K 1/04 180/65.1 |

(Continued)

FOREIGN PATENT DOCUMENTS

| | | |
|---|---|---|
| DE | 102010050826 A1 | 5/2012 |
| DE | 102011120960 | 4/2013 |

(Continued)

*Primary Examiner* — Emma K Frick
(74) *Attorney, Agent, or Firm* — Vichit Chea; Brooks Kushman P.C.

(57) ABSTRACT

A battery assembly is attached to a tray below a floor pan of a vehicle on a front channel and a rear channel that extend transversely relative to the vehicle. Edge reinforcements of the tray are secured by shear pins or other deformable connectors that retain the tray in a centered location on the channels until a side impact with a vehicle shears the shear pins and permits the tray to move laterally away from the location of impact.

12 Claims, 9 Drawing Sheets

(56) References Cited

U.S. PATENT DOCUMENTS

| | | | |
|---|---|---|---|
| 7,066,515 B2 * | 6/2006 | Pierce | B60R 19/00 180/68.5 |
| 7,070,015 B2 | 7/2006 | Mathews et al. | |
| 7,401,669 B2 * | 7/2008 | Fujii | B60R 16/04 180/65.1 |
| 7,717,207 B2 * | 5/2010 | Watanabe | B60K 1/04 180/274 |
| 7,931,105 B2 * | 4/2011 | Sato | B60K 1/04 180/2.1 |
| 7,954,198 B2 * | 6/2011 | Renius | B60S 1/342 15/250.3 |
| 8,037,960 B2 * | 10/2011 | Kiya | B60K 1/04 180/68.5 |
| 8,051,934 B2 * | 11/2011 | Kiya | B60K 1/04 180/274 |
| 8,276,697 B2 * | 10/2012 | Takasaki | B60K 1/04 180/68.5 |
| 8,276,698 B2 | 10/2012 | Guss et al. | |
| 8,789,634 B2 | 7/2014 | Nitawaki | |
| 9,027,684 B2 | 5/2015 | Araki | |
| 9,139,074 B2 | 9/2015 | Jarocki | |
| 9,409,470 B2 * | 8/2016 | Trentin | B60K 1/04 |
| 9,487,237 B1 * | 11/2016 | Vollmer | B62D 21/152 |
| 9,517,686 B1 * | 12/2016 | Paramasivam | B60K 1/04 |
| 9,643,660 B2 * | 5/2017 | Vollmer | B62D 25/2072 |
| 9,776,588 B2 * | 10/2017 | Wolkenstein | B60R 21/0134 |
| 9,963,028 B1 * | 5/2018 | Pachore | B60K 1/04 |
| 2002/0034413 A1 * | 3/2002 | Liu | B23G 1/261 403/2 |
| 2009/0226806 A1 * | 9/2009 | Kiya | B60K 1/04 429/186 |
| 2009/0242298 A1 * | 10/2009 | Guss | B60K 1/04 180/68.5 |
| 2010/0101885 A1 * | 4/2010 | Nozaki | B60K 1/00 180/232 |
| 2010/0147608 A1 * | 6/2010 | Okabe | B60K 1/04 180/65.31 |
| 2012/0282496 A1 * | 11/2012 | Schaefer | B60L 3/0007 429/7 |
| 2013/0270863 A1 | 10/2013 | Young et al. | |
| 2015/0151624 A1 | 6/2015 | Yamada et al. | |
| 2015/0231956 A1 | 8/2015 | Trentin et al. | |
| 2015/0239331 A1 * | 8/2015 | Rawlinson | B60K 1/04 180/68.5 |
| 2016/0344058 A1 * | 11/2016 | Naito | H01M 8/2484 |

FOREIGN PATENT DOCUMENTS

| | | |
|---|---|---|
| DE | 102012017879 | 3/2014 |
| DE | 102013218811 A1 | 3/2015 |
| WO | WO2014147328 | 9/2014 |

* cited by examiner

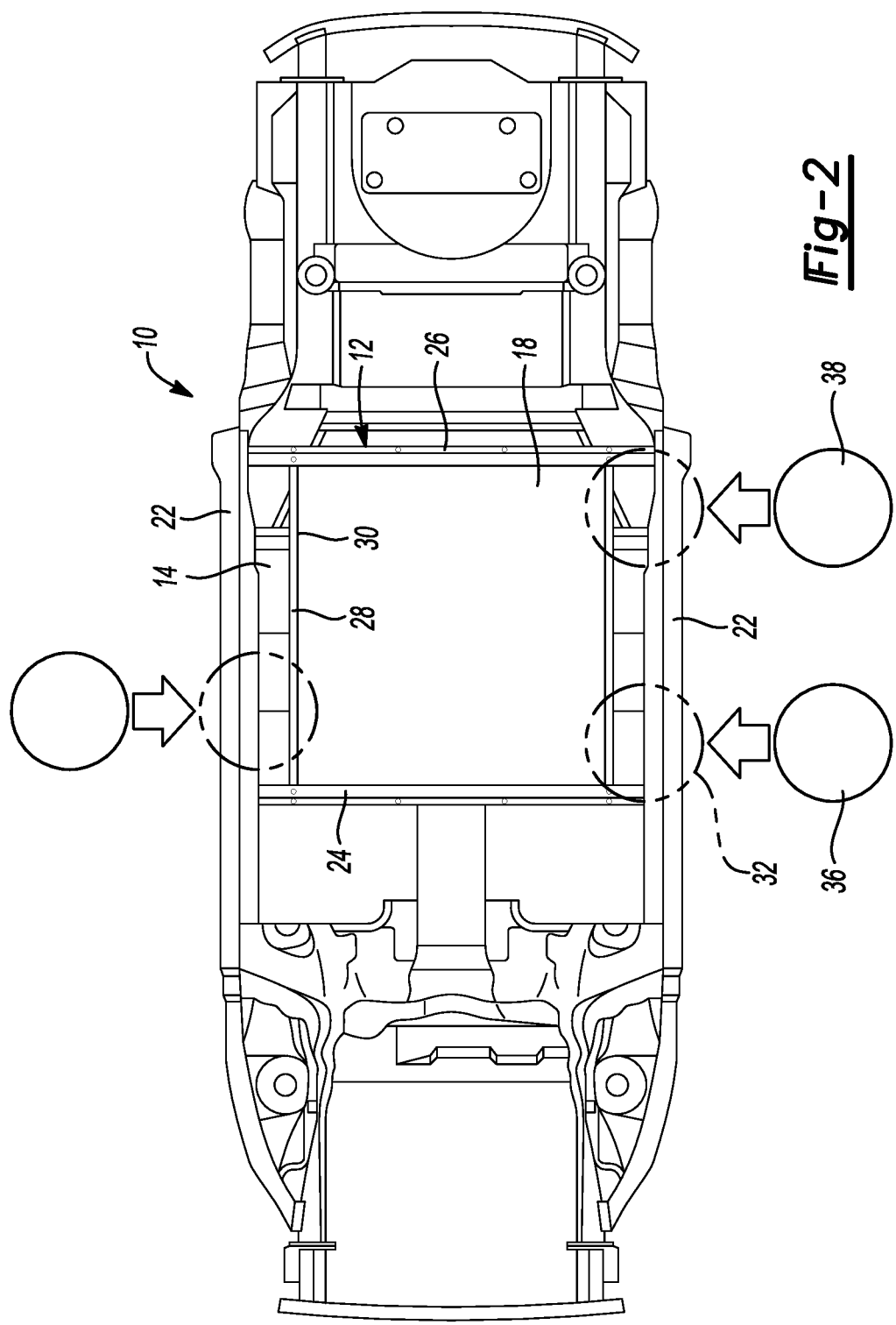

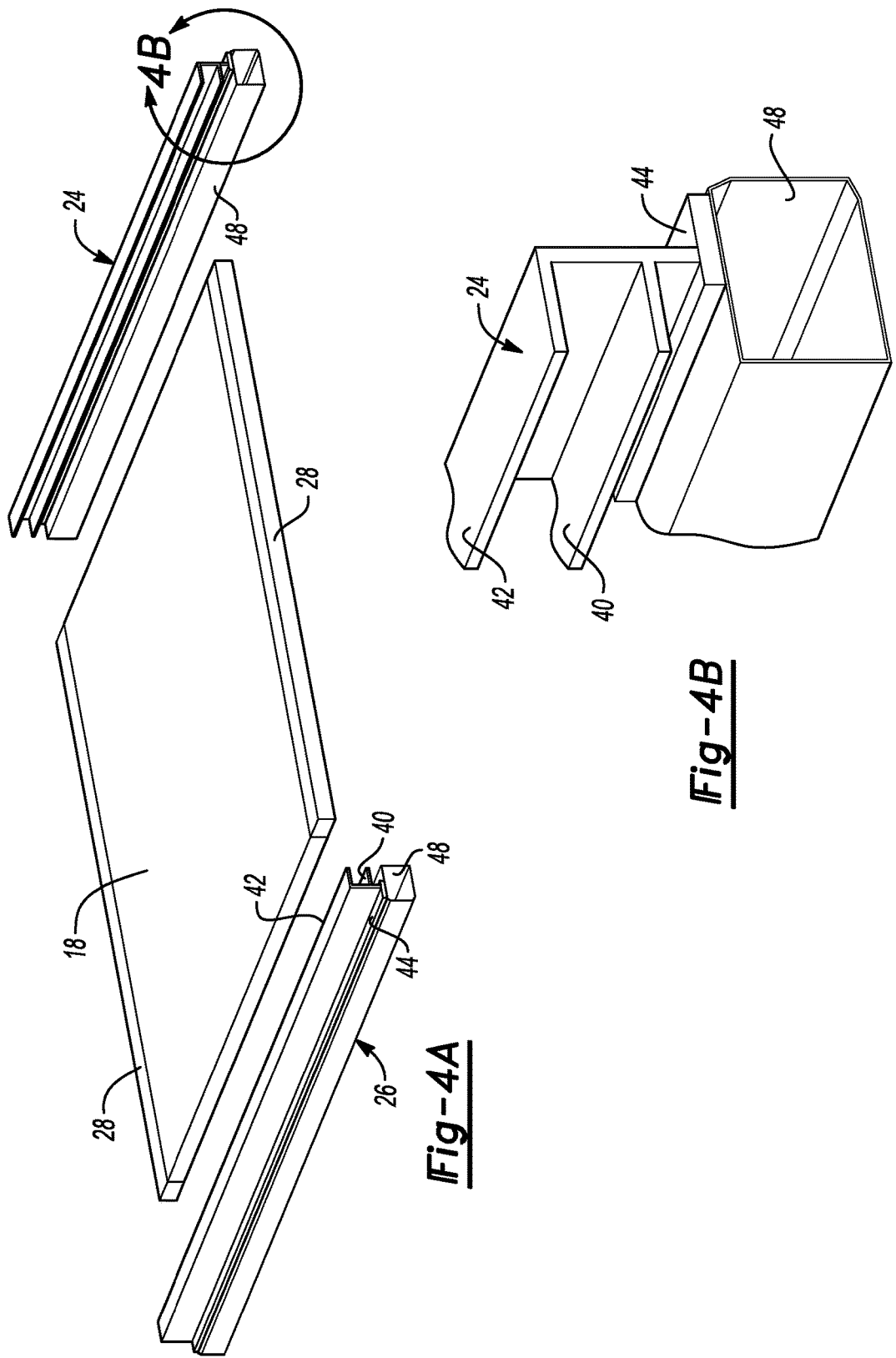

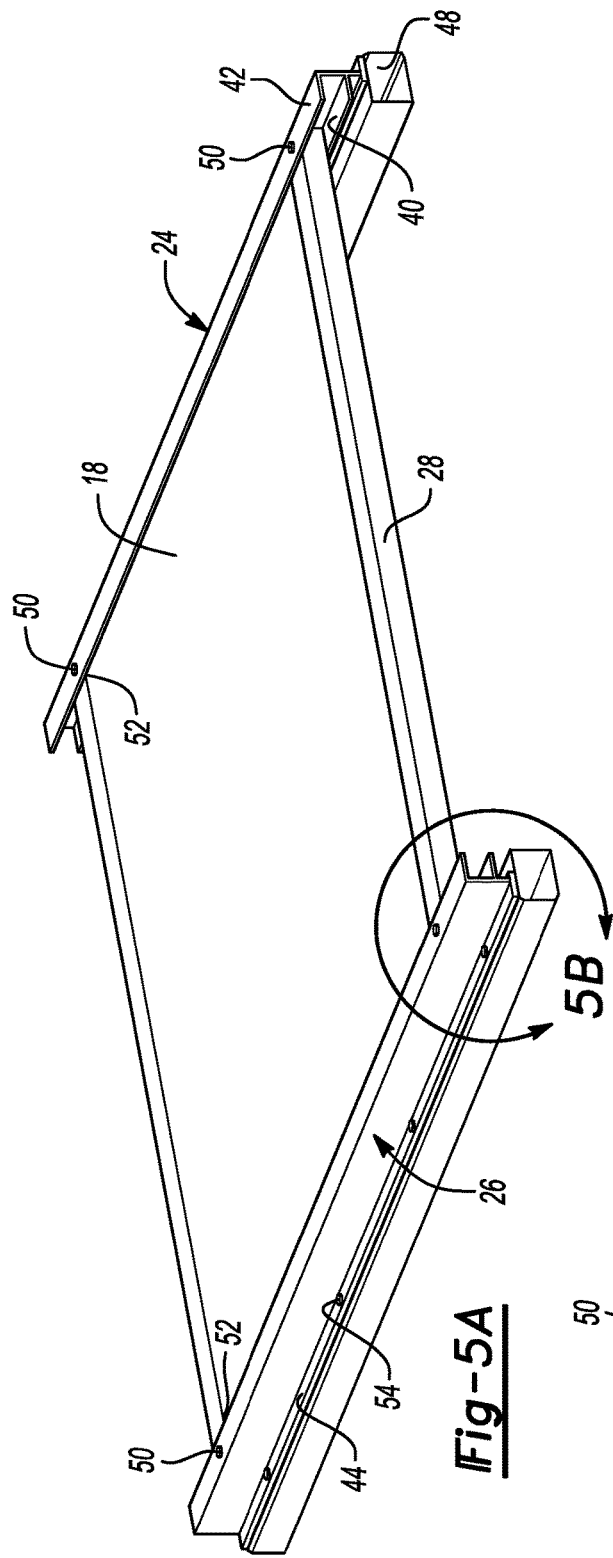
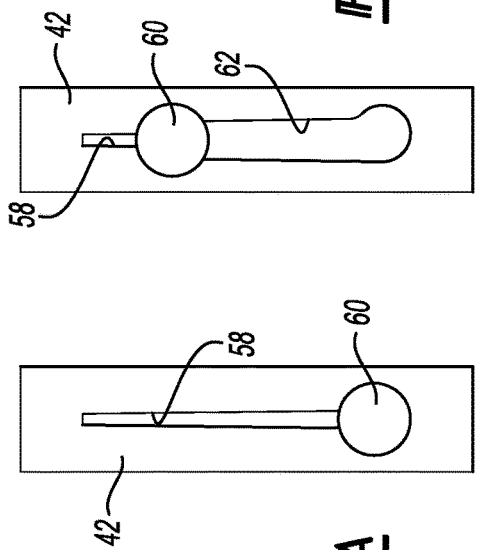
Fig-7A
Fig-7B
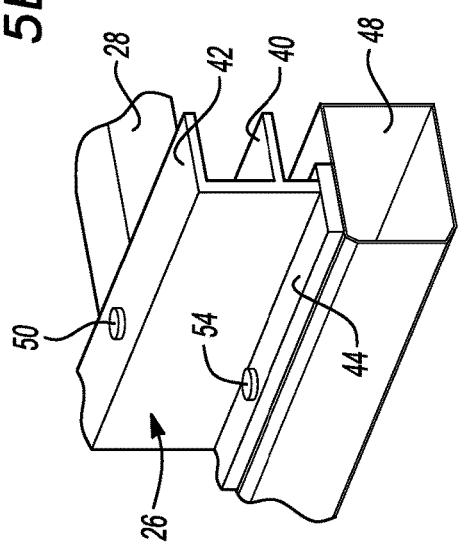
Fig-5A
Fig-5B

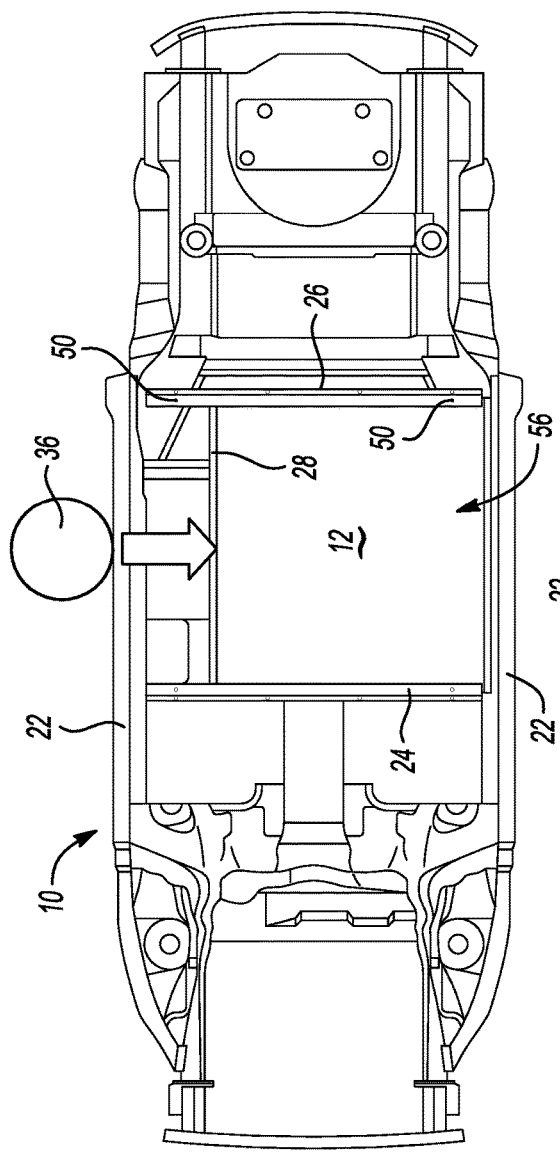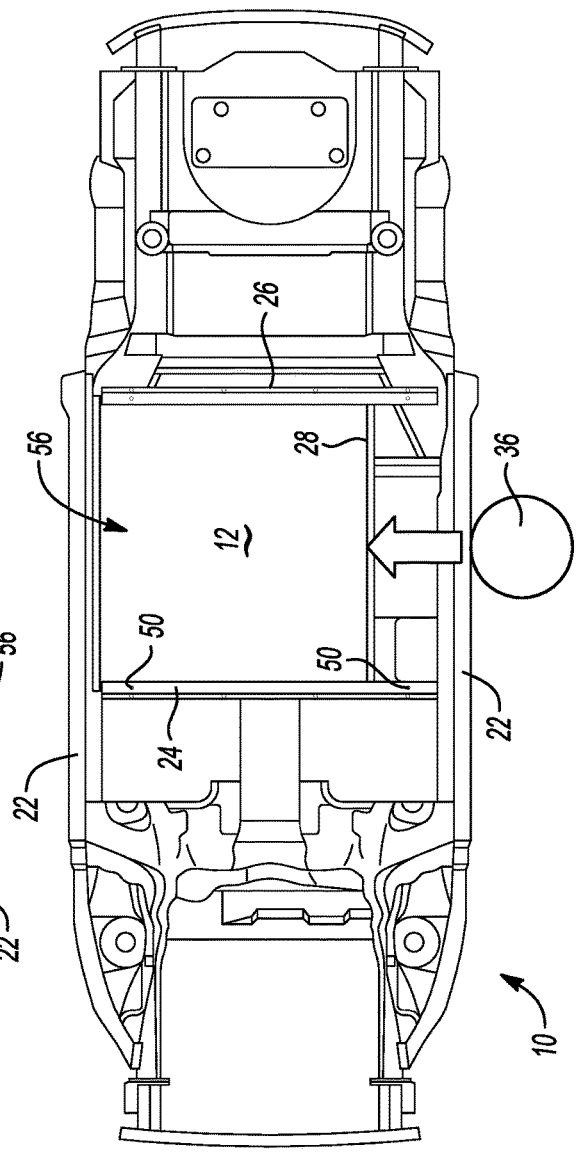

SLIDING PROTECTIVE BATTERY SUPPORT TRAY

CROSS-REFERENCE TO RELATED APPLICATIONS

This application is a division of U.S. application Ser. No. 14/813,339 filed Jul. 30, 2015, the disclosure of which is hereby incorporated in its entirety by reference herein.

TECHNICAL FIELD

This disclosure relates to a protective battery support tray for a battery of a battery electric vehicle, hybrid electric vehicle, or partial hybrid electric vehicle.

BACKGROUND

Battery cells for Battery Electric Vehicles (BEV), Hybrid Electric Vehicles (HEV) and Partial Hybrid Electric Vehicles (PHEV) are remotely packaged away from anticipated crash zones to reduce the risk of damage as a result of a collision. The central area under the passenger compartment floor is a potential location for the battery because it is spaced away from the outer body of the vehicle and is protected by sub-floor cross car members, rocker assemblies, and underbody side frame structures. Under floor packaging is relatively a safe zone for the battery pack in full frontal and rear barrier crashes. However, in side crashes such as Moving Deformable Barrier (MDB) test and Side Pole (SP) test, vehicle rockers and cross members have a tendency to bend and wrap around the impacting barrier or pole. The most severe damage to battery compartment occurs during side pole impacts. Side body impacts may cause the floor structure to collapse towards the battery pack and may increase the risk of damage to the battery system.

To avoid damage to the battery pack, one approach was tested in a simulation in which a gap of about 8 inches was provided on both sides of the floor along with up-gaging and strengthening the rocker and cross-members with additional reinforcements, and higher strength materials. Limiting side pole intrusions to less than 8" into the floor structure can be achieved with sufficient strengthening of the rocker and cross-members thereby avoiding potential damage to battery pack. However, strengthening the body structure results in much higher cost and weight penalty, and reduces the benefits to be gained from having a BEV, HEV or PHEV in terms of energy efficiency and exhaust emissions.

This disclosure is directed to solving the above problems and other problems as summarized below.

SUMMARY

According to one aspect of this disclosure, a battery assembly is disclosed for a vehicle. The battery assembly comprises a battery and a tray receiving the battery. At least one frangible, or breakable, connector attaches the tray to the vehicle. An edge reinforcement is attached to each lateral side of the tray. A front channel and a rear channel are attached to the vehicle to guide the tray as the tray slides away from an impact location when the frangible connector breaks in a side impact collision.

According to another aspect of this disclosure, a battery support assembly is assembled between a front cross member and a rear cross member of a vehicle. The assembly comprises a battery and a tray supporting the battery. A pair of transversely extending guide rails are each attached to one of the cross members. A pair of edge reinforcements are each attached to a longitudinally extending side of the tray. At least one shear pin connects one of the edge reinforcements to one of the guide rails.

According to a further aspect of this disclosure, a vehicle is disclosed that includes a passenger compartment having a floor pan supported on a front cross member and a rear cross member and a traction battery disposed below the passenger compartment. The vehicle comprises a battery support tray for retaining the battery that includes a right reinforcement and a left reinforcement on longitudinally extending sides of the tray. A front guide rail supports a front edge of the tray and a rear guide rail supports a rear edge of the tray. A shear connector is operatively connected between the battery support tray, the front guide rail and the rear guide rail to hold the tray in a centered location until a collision force of a predetermined magnitude is applied to a lateral side of the vehicle. The shear connector shears when the collision force is applied to the vehicle and the tray slides laterally across the front and rear guide rails.

According to another aspect of this disclosure, the edge reinforcement may be attached to the lateral sides of the tray adjacent the front channel and the rear channel, and may have an intermediate portion spaced from the lateral sides of the tray. A force applied to one of the edge reinforcements may break the frangible connector to enable the tray to slide across the front channel and the rear channel. One example of a frangible connector is a shear pin. A lever arm may be provided on the shear pin to allow the edge reinforcement to apply torque to the shear pin.

In a side impact collision, an impact force is applied to the edge reinforcement that is used to break the frangible connector and is then used to slide the tray and battery away from the location of the impact. The frangible connector may further comprise a plurality of frangible connectors, with one frangible connector being provided at each corner of the tray.

The above aspects and other aspects of this disclosure are described below with reference to the attached drawings.

BRIEF DESCRIPTION OF THE DRAWINGS

FIG. 2 is a bottom plan view of the vehicle showing side/pole impact-regulatory locations and due care locations for crush intrusions into the floor structure that potentially may affect the battery tray assembly.

FIG. 4A is an exploded perspective view of components of the battery tray assembly featuring the front and rear channels.

FIG. 4B is an enlarged perspective view of a front channel taken at circle 4B in FIG. 4A.

FIG. 5A is a perspective view showing a battery tray including edge reinforcements received in the front and rear channel.

FIG. 5B is an enlarged perspective view of a rear channel taken at circle 5B in FIG. 5A.

FIG. 6A is a bottom plan view showing the battery assembly sliding in response to a side/pole impact on a passenger side of the vehicle.

FIG. 6B is a bottom plan view showing the battery assembly sliding in response to a side/pole impact on a driver's side of the vehicle.

FIG. 7A illustrates one embodiment of a sliding mechanism for a battery pack assembly including an attachment bolt and a V-shaped slit, or notch, in a channel before a collision event.

FIG. 7B illustrates one embodiment of a sliding mechanism for a battery pack assembly including an attachment bolt and a V-shaped slit, or notch, in a channel after a collision event.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
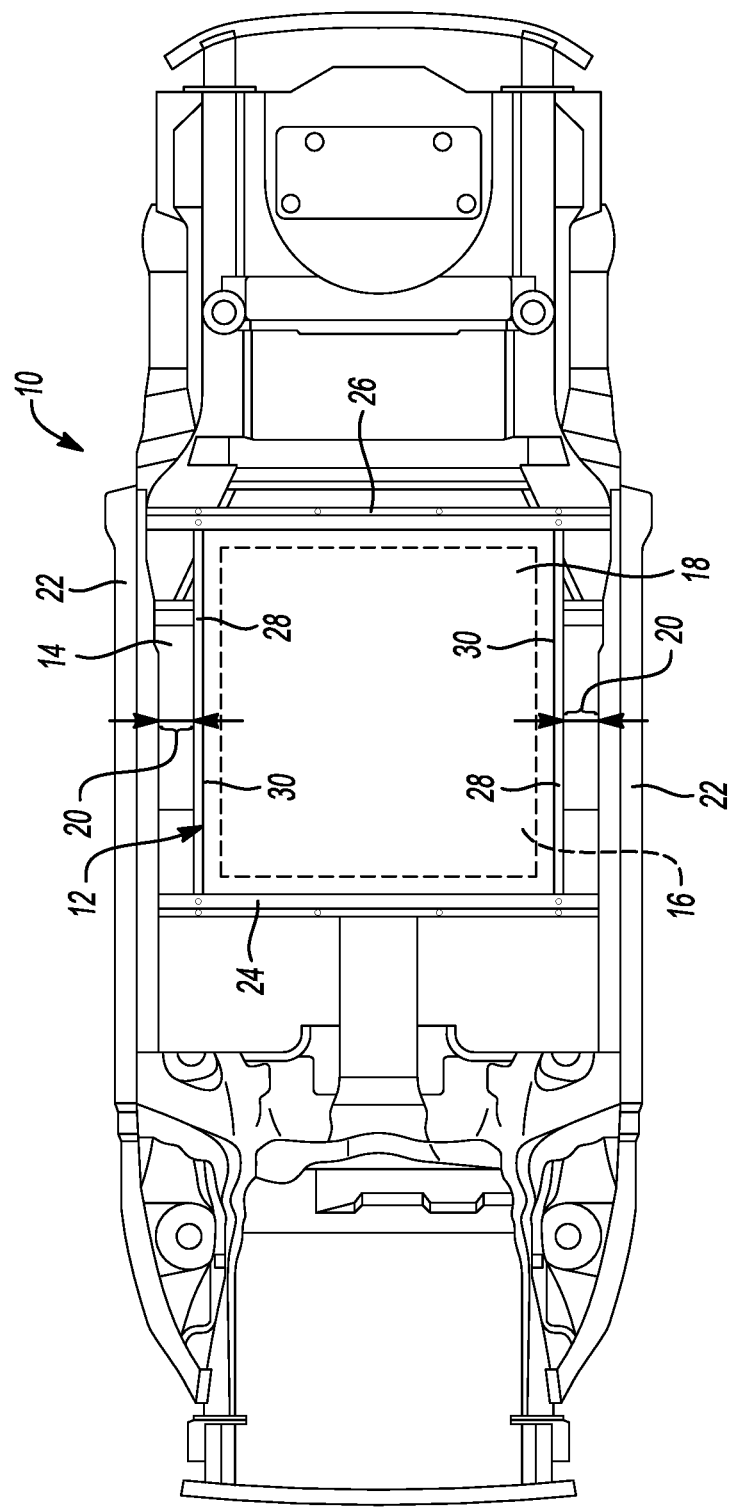
FIG. 1 is a bottom plan view of a vehicle including a battery assembly packaged under a floor pan of a passenger compartment.

Referring to FIGS. 1 and 2, a vehicle 10 is illustrated in a bottom plan view that includes a battery assembly 12 attached to the vehicle 10 below the floor pan 14. The battery assembly 12 includes a battery pack that is shown in phantom lines and identified by reference numeral 16. The battery pack 16 is supported by the floor pan 14. The battery pack 16 is the traction battery for a hybrid or battery electric vehicle that provides the motive power, or traction, for the vehicle 10.

A tray 18 is provided that supports the battery pack 16. A pair of gaps 20 are defined between the tray 18 and a pair of rocker assemblies 22 of the vehicle 10. A front channel 24, or guide rail, and a rear channel 26 support the tray 18 below the floor pan 14. A pair of edge reinforcements 28 are provided on opposite lateral sides 30 of the tray 18.

With specific reference to FIG. 2, three different potentially affected locations 32 are circled on the image that indicate the location or potential locations for deformation in a side collision. A side/pole impact pole 36 is diagrammatically illustrated in FIG. 2 that corresponds to the prescribed location for a side/pole impact test. Other locations, known as due care locations 38, illustrate other potential test locations for testing the vehicle in a side impact, such as a moving deformable barrier (MDP) and a side pole test (SPT).

Figure 3A:
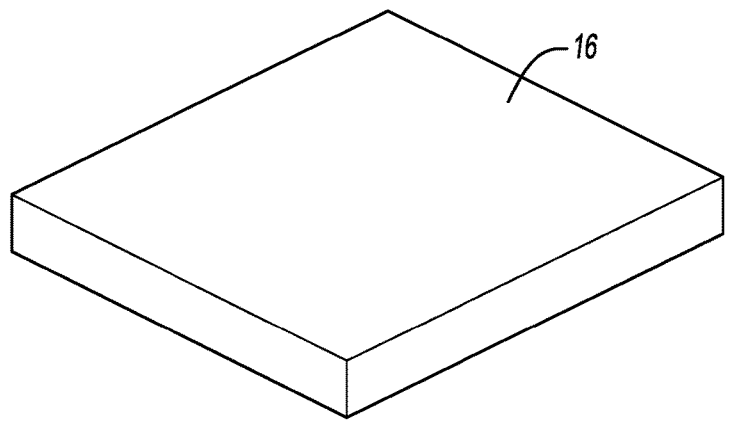
FIGS. 3A-3E are series of views showing one example as to how the components of the battery pack and support assembly may be assembled.

Referring to FIG. 3A, a battery pack 16 is illustrated in isolation. While the battery pack 16 is shown as a rectangular shape, it should be understood that the battery pack may take other shapes.

Figure 3B:
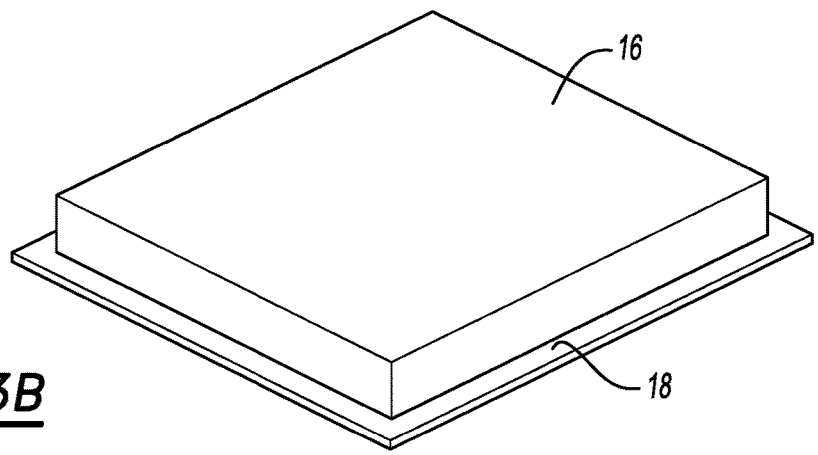

Referring to FIG. 3B, the battery pack 16 is shown assembled to a tray 18.

Figure 3C:
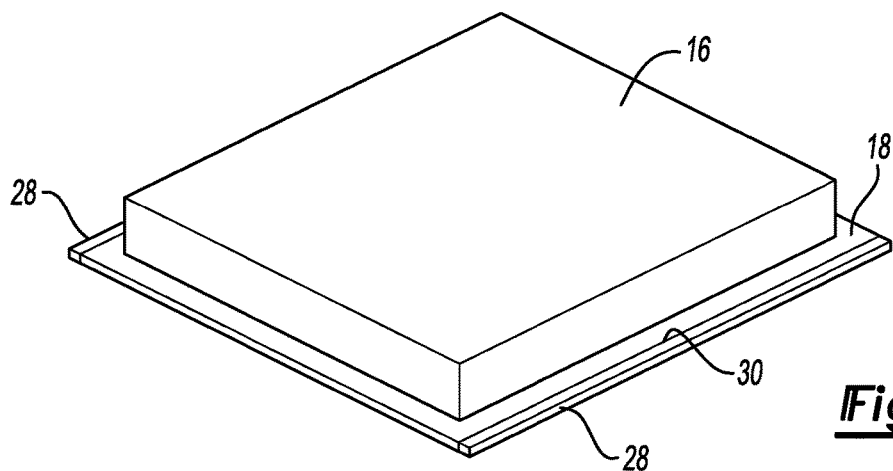

Referring to FIG. 3C, the battery pack 16 is shown attached to the tray 18 with side reinforcements 28 attached to the lateral sides 30 of the tray 18.

Figure 3D:
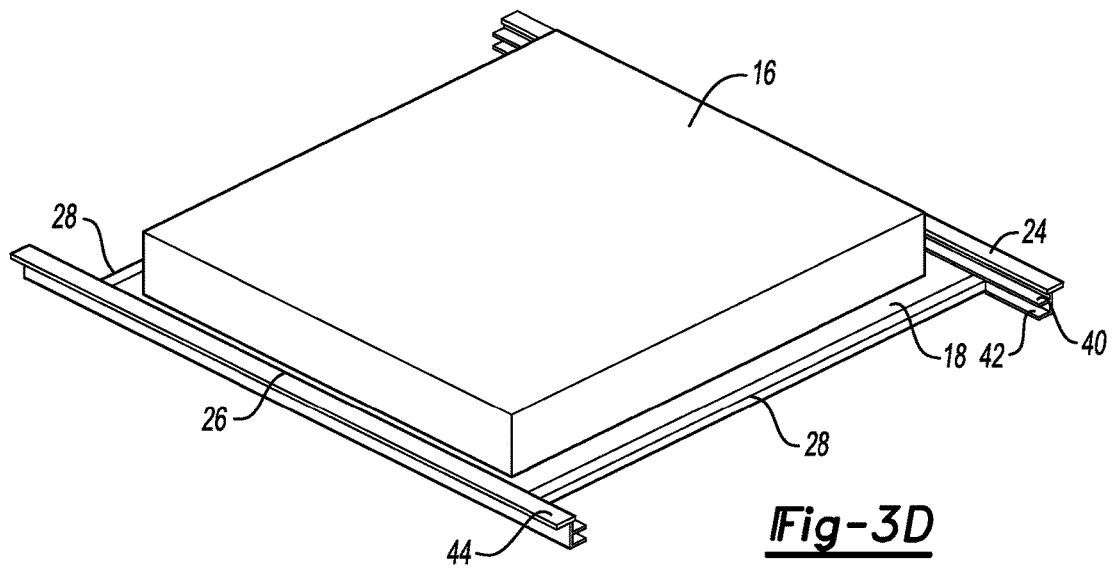
Figure 3E:
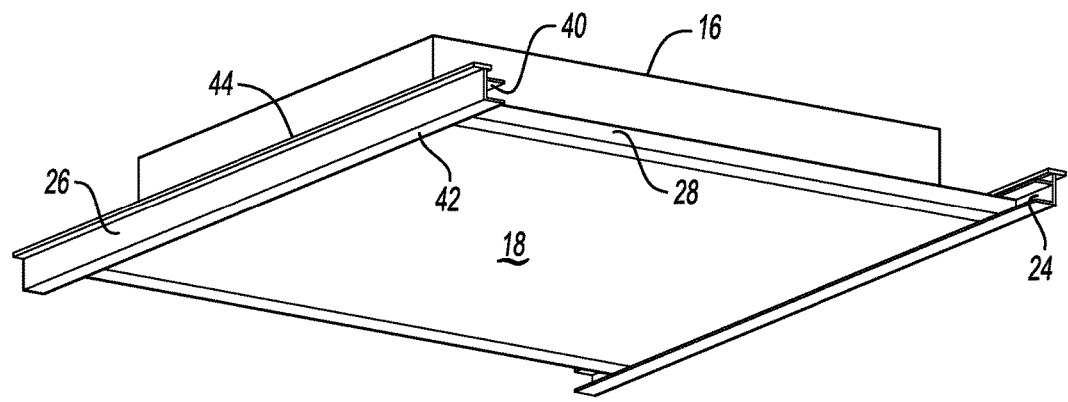

Referring to FIGS. 3D and 3E, the battery pack 16 is shown to be supported on the tray 18. The tray 18 is reinforced by the reinforcements 28 on opposite lateral sides. The tray 18 and reinforcements 28 are received between the upper flange 40 and lower flange 42 of the front and rear channels 24, 26.

Referring to FIGS. 4A and 4B, the tray 18 including the side reinforcements 28 are shown separated from the front channel 24 and rear channel 26. In FIG. 4B, an end of the front channel 24 is shown in an enlarged view for better visibility. The front channel 24 is attached to a transverse tubular beam 48 that is part of the vehicle chassis structure. The front channel 24 is attached by the attachment flange 44 to the transverse tubular beam 48. As shown in FIGS. 4A and 4B, the tray is inverted with the lower flange 42 being shown above the upper flange 40. It should be understood that the front channel 24 and rear channel 26 are suspended from the transverse tubular beam 48.

Referring to FIGS. 5A and 5B, the tray 18 is shown with edge reinforcements 28 assembled to the front channel 24 and rear channel 26. The tray 28 is received between the upper flange 40 and lower flange 42. In FIGS. 5A and 5B, the tray 18 and front and rear channels 24, 26 are inverted so that the upper flange 40 is shown below the lower flange 42. The portion of the rear channel 26 shown in FIG. 5B is attached by shear pins 50 to the corners 52 of the tray 18. The shear pins 50 extend through the lower flange 42 and into the reinforcements 28. The shear pins 50 are disposed at the corners 52 of the tray 18. Fasteners 54 extend through the attachment flange 44 to secure the front channel 24 and rear channel 26 to the transverse tubular beam 48.

Referring to FIGS. 6A and 6B, the vehicle 10 is shown in FIG. 6A in a side/pole test with the pole 36 shown engaging the rocker assembly 22 on the passenger side of the vehicle. In FIG. 6B, the pole is shown engaging the rocker panel 22 on the driver's side of the vehicle. Driver's side and passenger side as used herein refers to the normal vehicle configuration for North American vehicles, but it should be understood that the references are interchanged for right-side drive vehicles. When the vehicle is impacted by the pole 36, the rocker assembly 22 collapses toward the battery assembly 12. The pole 36 impacts the battery assembly 12 and causes the battery assembly 12 to move away from the pole 36 toward the opposite side of the vehicle. Movement of the battery pack 12 is only permitted after the impact with the pole 36 exerts a predetermined force on the edge reinforcement 28 to cause the shear pin 50 to break. The shear pins 50 are referred to herein more broadly as frangible connectors. Shifting the battery assembly 12 away from the pole 36 effectively provides additional space for absorbing the collision energy and protects the battery pack 16 (shown in FIGS. 1 and 3A-3E) from damage.

Referring to FIG. 7A, an alternative embodiment of a frangible connector is shown that includes a V-shaped slit 58 defined by the front channel 24 or rear channel 26. An attachment bolt 60 is used to secure the tray 18 to the front channel 24 or rear channel 26 (shown in the preceding figures). The V-shaped slit 58 is formed in the lower flange 42. In FIG. 7A, the attachment bolt 60 is shown in one end of the V-shaped slit 58 in a pre-impact condition.

Referring to FIG. 7B, the V-shaped slit is shown after an impact force to the tray causes the attachment bolt 60 to move within the V-shaped slot 58. The attachment bolt 60 creates a deformed slit 62 as the attachment bolt 60 slides through the V-shaped slot 58. Energy from the impact force is absorbed as the attachment bolt 60 deforms the slot 58. In the embodiments shown in FIGS. 7A and 7B, the attachment bolt does not break, but instead traverses the V-shaped slit 58. This should also be understood to be a type of frangible connector even though the slit is only deformed and does not break as a result of the collision.

Figure 8A:
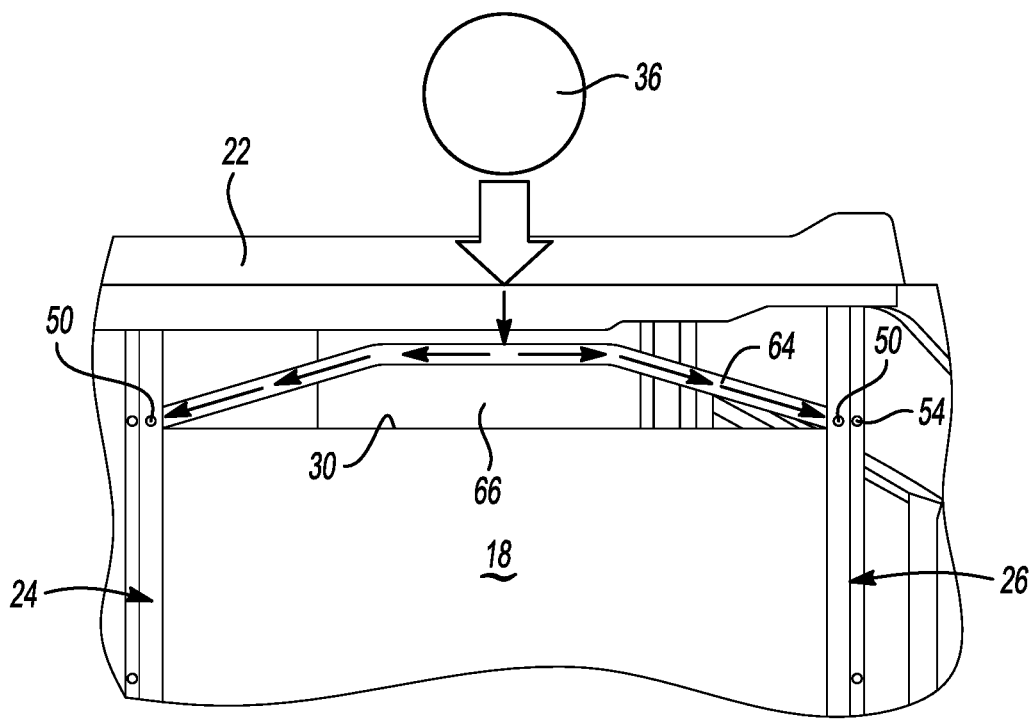
FIG. 8A is a fragmentary bottom plan view of one side of a vehicle including a battery assembly and an edge reinforcement defining a trapezoidal space between the tray and the edge reinforcement.

Referring to FIG. 8A, an alternative embodiment of a reinforcement is shown that is attached to the tray 18 adjacent the connection with the front channel 24 and rear channel 26. A central portion of the reinforcement 64 is spaced from the side 30 of the tray 18. A trapezoidal space 66 is defined between the reinforcement 64 and the lateral side 30 of the tray 18. A pole 36 is shown in position to contact the vehicle at an intermediate location on the reinforcement 64. The reinforcement 64 is contacted before the tray 18 and the force is transferred by the reinforcement 64 to the shear pins 50 that connect the ends of the reinforcement to the front channel 24 and rear channel 26. The force applied to the reinforcement 64 allows the shear pins 50 to shear at an earlier time than in the embodiment shown in FIGS. 1 and 2 wherein the edge reinforcements 28 are attached to the lateral sides 30 of the tray 18.

Figure 8B:
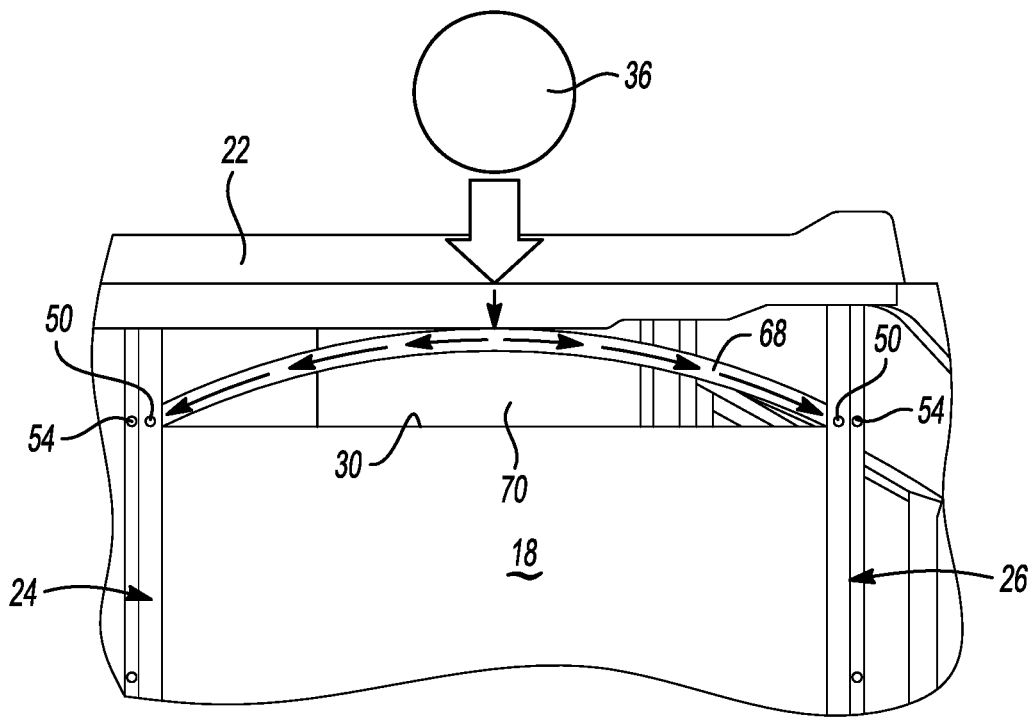
FIG. 8B is a fragmentary perspective view of a vehicle including a battery assembly having an edge reinforcement defining an arcuate space between the edge reinforcement and the tray.

Referring to FIG. 8B, another alternative embodiment of a reinforcement is illustrated that includes an arcuate reinforcement 68. The arcuate reinforcement is attached at opposite ends by the shear pins 50 to the front channel 24 and rear channel 26. The front channel 24 and rear channel 26 are attached by the fasteners 54 to a transverse tubular beam 48, as shown in FIGS. 4A and 4B. The impact pole 36 is shown aligned with the central portion of the arcuate reinforcement 68 that is also in contact, as shown in FIG. 8B, with the rocker assembly 22. In an impact with pole 36, the impact force is transmitted through the arcuate reinforcement 68 to the shear pins 50 that connect the reinforcement 68 to the front channel 24 and rear channel 26. Upon impact with the pole, the arcuate reinforcement 68 shears the shear pins 50.

Figure 9:
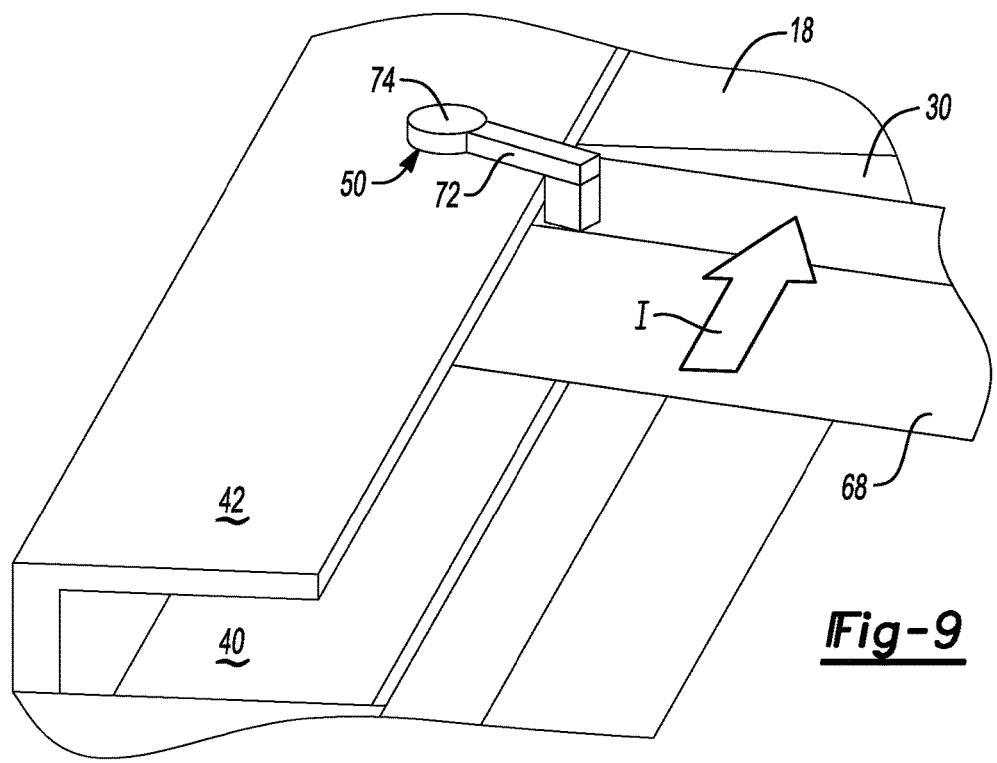
FIG. 9 is a fragmentary perspective view of an arcuate edge reinforcement attached to a guide rail with a shear pin including a lever arm that is actuated by lateral movement of the edge reinforcement.
Figure 10:
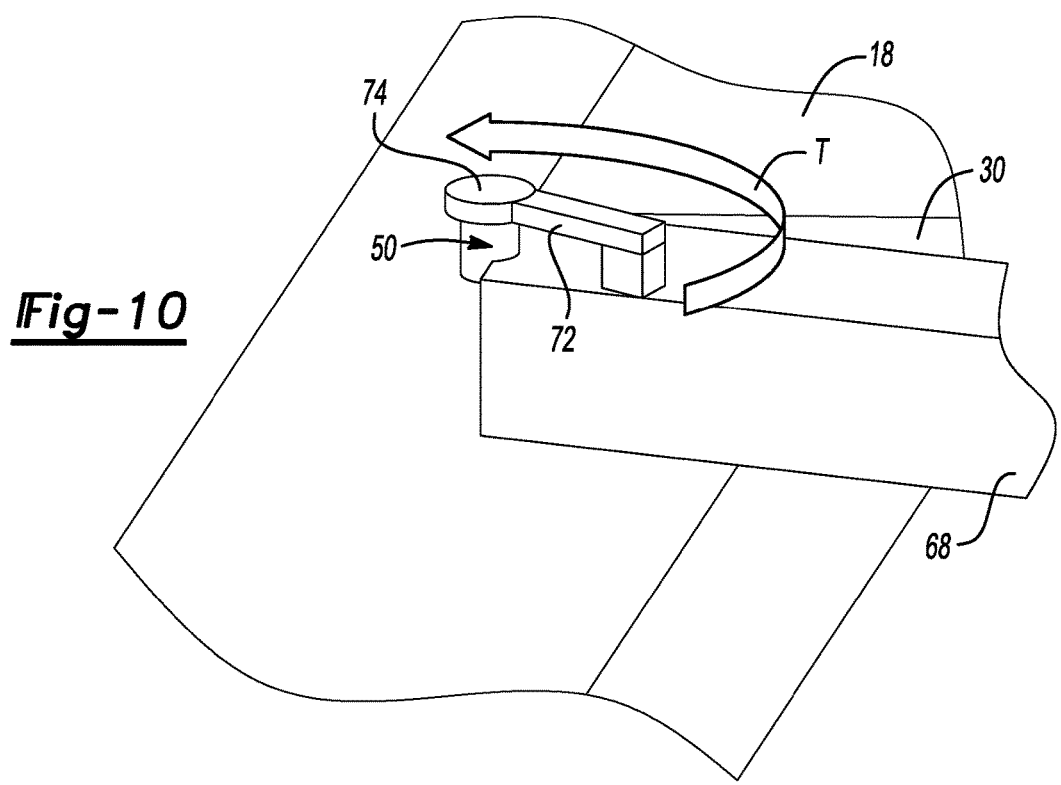
FIG. 10 is a fragmentary perspective view showing an arcuate edge reinforcement received in a guide rail with an induced torque being applied to the lever arm of the shear pin being illustrated by a curved arrow.

Referring to FIGS. 9 and 10, the battery pack shown supported by the tray 18 that includes reinforcements 68. The tray 18 and reinforcements 68 are received between the upper flange 40 and lower flange 42

Referring to FIG. 9, an arrow "I" indicates the direction of an impact that is applied to the arcuate reinforcement 68. It should be understood that the embodiment of the shear pin 50 with the lever arm 72 may also be used with the edge reinforcement 64 shown in FIG. 8A or the edge reinforcements 28 shown in FIGS. 1-3.

Referring to FIG. 10, an arrow "T" is shown illustrating the induced torque applied to the shear pin 50 caused by the impact I shown in FIG. 9. The induced torque T rotates the shear pin 50 with the lever arm 72 that increases the force applied to the shear pin 50 in a side impact collision. In response to the application of the induced torque T, the shear pin 50 is twisted until it breaks thereby freeing the tray 18 to slide away from the impact force toward the opposite side of the vehicle on the front and rear channels 24, 26.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A battery assembly for a vehicle comprising:
   a battery;
   a tray receiving the battery;
   a plurality of frangible connectors attaching the tray to the vehicle;
   a front channel and a rear channel attached to the vehicle that guides the tray as the tray slides away from an impact location; and
   a pair of edge reinforcements each connected to the front channel at a first end and the rear channel on a second end, each edge reinforcement having an intermediate portion defining a space relative to one of the lateral sides of the tray, wherein an impact force applied to one of the edge reinforcements reduces the space between the intermediate portion and the lateral side of the tray, wherein the first and second ends thereof directly apply the impact force to the frangible connectors to break the frangible connectors enabling the tray to slide across the front channel and the rear channel.

2. A battery assembly for a vehicle comprising:
   a battery;
   a tray receiving the battery;
   front and rear channels supporting the tray that extend between a pair of rocker assemblies;
   plural shear pins each including a lever arm, the shear pins secure the tray to the front and rear channels; and
   an edge reinforcement spaced from the tray between opposite ends thereof that engage and rotate the lever arms to break the shear pins.

3. The battery assembly of claim 2 wherein one shear pin is provided at each corner of the tray.

4. The battery assembly of claim 2 wherein in a side impact collision an impact force applied to the edge reinforcement to break the shear pins and slide the tray and battery away from a location of an impact.

5. A battery support assembly between a front cross member and a rear cross member of a vehicle, the assembly comprising:
   a battery;
   a tray supporting the battery;
   a pair of transversely extending guide rails each attached to one of the cross members;
   a pair of edge reinforcements each attached to a lateral side of the tray;
   at least one shear pin connecting one edge reinforcement to one of the transversely extending guide rails, wherein the pair of edge reinforcements are attached to the tray adjacent a first one of the guide rails and a second one of the guide rails, wherein the edge reinforcements have has an intermediate portion defining a space with the lateral sides of the tray, wherein a force applied to one of the edge reinforcements collapses one of the edge reinforcements towards the tray reducing the space and breaking the at least one shear pin to enable the tray to slide across the first guide rail and the second guide rail; and
   a lever arm connecting the shear pin to one of the edge reinforcements, wherein the edge reinforcement applies torque to break the shear pin.

6. The battery support assembly of claim 5 wherein the shear pin further comprises a plurality of shear pins, wherein one shear pin is provided at each corner of the tray.

7. The battery support assembly of claim 5 wherein in a side impact collision an impact force applied to one of the edge reinforcements breaks the shear pin and slides the tray and battery away from an impact location.

8. A vehicle including a passenger compartment having a floor pan supported on a front cross member and a rear cross member, the vehicle having a traction battery disposed below the passenger compartment, the vehicle comprising:
a battery support tray retaining the traction battery and having a right reinforcement and a left reinforcement on longitudinally extending sides of the tray;
a front guide rail supports a front edge of the tray;
a rear guide rail supports a rear edge of the tray;
a shear pin operatively connected between the battery support tray and the front guide rail and the rear guide rail holds the tray in a centered location until a collision force of a predetermined magnitude is applied to a lateral side of the vehicle, wherein the right reinforcement and left reinforcement are attached to the sides of the tray adjacent the front guide rail and the rear guide rail, and has an intermediate portion spaced from the right and left longitudinally extending sides of the tray, wherein a force applied to one of the reinforcements moves the intermediate portion towards the tray and reduces the spacing from the sides of the tray and wherein the one reinforcement breaks the shear pin to enable the tray to slide along the front guide rail and the rear guide rail; and
a lever arm provided on a shear pin, wherein and the reinforcement applies torque to the shear pin when the collision force is applied to the lateral side of the vehicle.

9. The vehicle of claim 8 wherein the right reinforcement and left reinforcement each define a trapezoidal space with the longitudinally extending sides of the tray.

10. The vehicle of claim 8 wherein the right reinforcement and left reinforcement each define an arcuate space with the longitudinally extending sides of the tray.

11. The vehicle of claim 8 wherein the shear connector further comprises a plurality of shear pins, wherein one shear pin is provided at each corner of the tray.

12. The vehicle of claim 8 wherein the collision applied to the lateral side of the vehicle and, in turn, an impact force applied to the reinforcement breaks the shear connector and slides the tray and battery away from the location of the impact.

* * * * *